United States Patent
Treharne et al.

(10) Patent No.: US 8,712,616 B2
(45) Date of Patent: Apr. 29, 2014

(54) REGENERATIVE BRAKING CONTROL TO MITIGATE POWERTRAIN OSCILLATION

(75) Inventors: William David Treharne, Ypsilanti, MI (US); Jonathan Andrew Butcher, Farmington, MI (US); Dale Scott Crombez, Livonia, MI (US); Thomas Scott Gee, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 13/456,676

(22) Filed: Apr. 26, 2012

(65) Prior Publication Data
US 2013/0289809 A1   Oct. 31, 2013

(51) Int. Cl.
*B60L 11/00* (2006.01)

(52) U.S. Cl.
USPC ............ 701/22; 701/36; 701/70; 180/65.265; 180/65.285; 703/2

(58) Field of Classification Search
USPC ......... 701/22, 36, 70, 82, 87, 90; 180/65.265, 180/65.275, 65.285; 703/2
See application file for complete search history.

(56) References Cited

U.S. PATENT DOCUMENTS

| | | | |
|---|---|---|---|
| RE32,543 E | 11/1987 | Williamson | |
| 6,709,075 B1 | 3/2004 | Crombez et al. | |
| 7,024,290 B2 | 4/2006 | Zhao et al. | |
| 7,174,879 B1 * | 2/2007 | Chol et al. | 123/406.21 |
| 7,192,005 B2 * | 3/2007 | Denyer et al. | 251/129.08 |
| 7,243,010 B2 * | 7/2007 | Tabata et al. | 701/22 |
| 7,292,917 B2 * | 11/2007 | Kuang et al. | 701/22 |
| 7,324,888 B1 * | 1/2008 | Stotsky et al. | 701/101 |
| 7,513,847 B2 * | 4/2009 | Tabata et al. | 477/15 |
| 8,046,142 B2 * | 10/2011 | Morris et al. | 701/51 |
| 8,050,821 B2 * | 11/2011 | Morris et al. | 701/37 |
| 8,140,230 B2 * | 3/2012 | Haggerty et al. | 701/54 |
| 8,292,777 B2 * | 10/2012 | Puccetti et al. | 477/3 |
| 8,565,949 B2 * | 10/2013 | Christman et al. | 701/22 |
| 2010/0113214 A1 | 5/2010 | Krueger et al. | |
| 2010/0127562 A1 | 5/2010 | Yokoyama et al. | |
| 2011/0010031 A1 * | 1/2011 | Syed et al. | 701/22 |
| 2012/0059538 A1 * | 3/2012 | Morris | 701/22 |

FOREIGN PATENT DOCUMENTS

WO   2010049945 A1   5/2010

* cited by examiner

*Primary Examiner* — Russell Frejd
(74) *Attorney, Agent, or Firm* — David B. Kelley; Brooks Kushman, P.C.

(57) ABSTRACT

A vehicle is provided with at least one wheel and a motor that is coupled to the wheel. The motor is configured to provide regenerative brake torque. The vehicle also includes at least one controller that is configured to predict future powertrain oscillation based on input indicative of a wheel speed and a total brake torque. The controller is also configured to control the motor to reduce the regenerative brake torque prior to the powertrain oscillation.

20 Claims, 9 Drawing Sheets

REGENERATIVE BRAKING CONTROL TO MITIGATE POWERTRAIN OSCILLATION

TECHNICAL FIELD

One or more embodiments relate to a vehicle system and method for mitigating powertrain oscillation by controlling regenerative braking.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

The electric motor is connected to at least two wheels by a transmission or gearbox. The motor provides output torque to the wheels through the gearbox for propelling the vehicle. The motor may also receive input torque from the wheels through the gearbox for generating electricity and braking the vehicle (regenerative braking). Electric vehicles often include a braking system that utilizes both friction braking and regenerative braking Regenerative braking is used to recharge vehicle batteries, and recovers much of the energy that would otherwise be lost as heat during friction braking Therefore regenerative braking improves the overall efficiency or fuel economy of the electric vehicle as compared to vehicles only configured for friction braking.

During regenerative braking, interactions between an antilock braking system (ABS) of the vehicle, the powertrain and the road surface can result in deflections in the powertrain (i.e., powertrain oscillations). The powertrain oscillations can cause unpleasant noise and vibration, and can damage powertrain components over time. The powertrain may include a disengagement mechanism, such as a clutch, which may be utilized to reduce such powertrain oscillation. However, a powertrain that does not include a disengagement mechanism is susceptible to such powertrain oscillations during regenerative braking.

SUMMARY

In one embodiment, a vehicle is provided with at least one wheel and a motor coupled to the wheel. The wheel is configured to provide regenerative brake torque. The vehicle also includes at least one controller that is configured to predict future powertrain oscillation based on input indicative of a wheel speed. The controller is also configured to control the motor to reduce the regenerative brake torque prior to the powertrain oscillation.

In another embodiment, a vehicle system is provided with a motor that is configured to provide regenerative brake torque to at least one wheel. The vehicle system also includes at least one controller that is configured to predict future powertrain oscillation based on input indicative of a total brake torque. The controller is also configured to control the motor to reduce the regenerative brake torque prior to the powertrain oscillation.

In yet another embodiment, a method is provided for controlling regenerative braking. Input is received that is indicative of at least one wheel speed and a total brake torque. An event is predicted that is associated with powertrain oscillation based on at least one of the wheel speed and the total brake torque. A motor is controlled to reduce a regenerative brake torque prior to the event for reducing powertrain oscillation.

The vehicle, vehicle system and method provide advantages by predicting future powertrain oscillations based on input signals, and reducing regenerative braking prior to the powertrain oscillations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
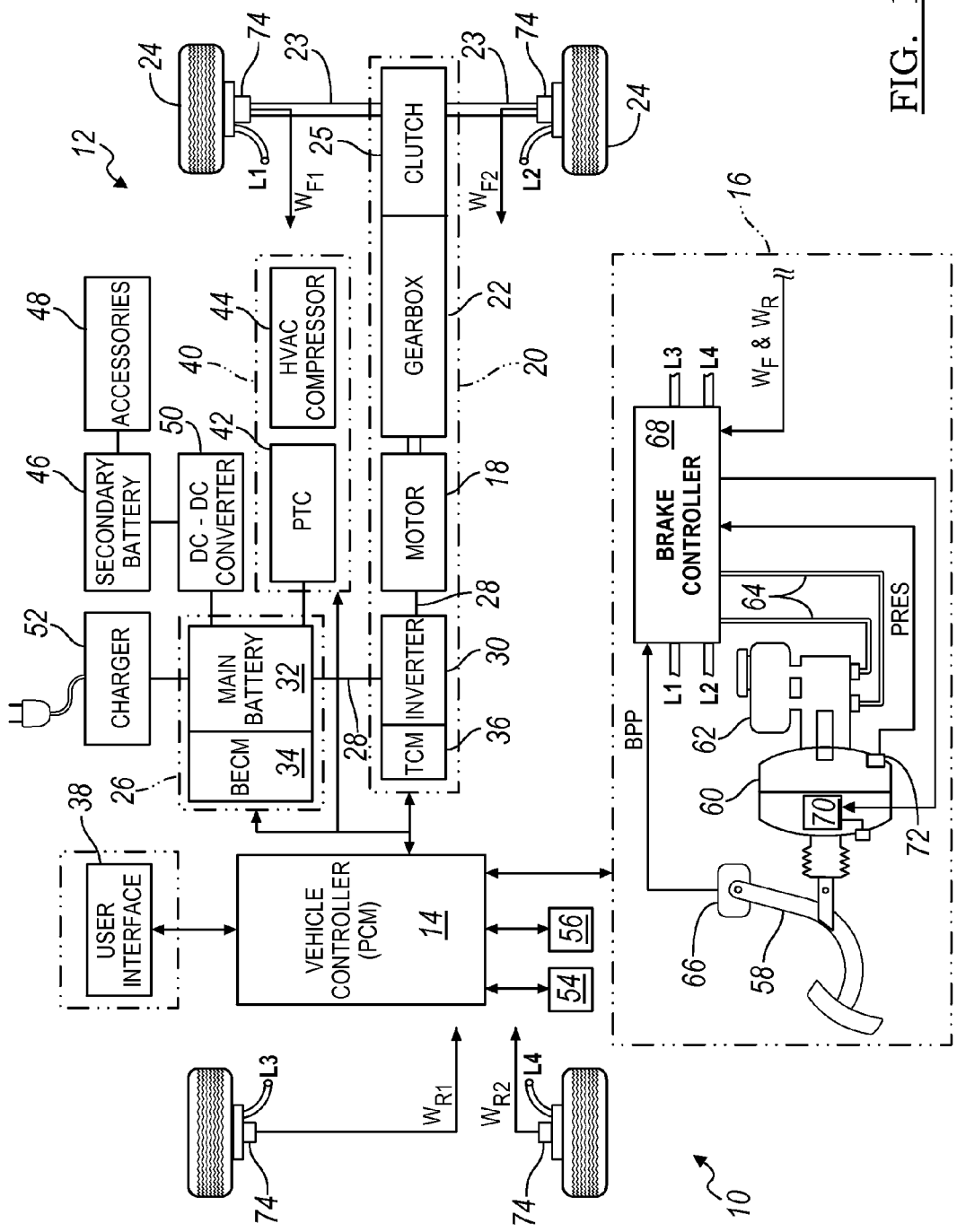
FIG. 1 is a schematic diagram of a vehicle system for mitigating powertrain oscillation according to one or more embodiments.

With reference to FIG. 1, a vehicle system for mitigating powertrain oscillation is illustrated in accordance with one or more embodiments and is generally referenced by numeral 10. The vehicle system 10 is depicted within a vehicle 12. The vehicle system 10 includes a vehicle controller 14 and a brake system 16 that are in communication with each other. The vehicle controller 14 coordinates with the brake system 16 to decelerate or "brake" the vehicle using both friction braking and regenerative braking. The vehicle controller 14 and the brake system 16 also coordinate to predict future powertrain oscillations and reduce regenerative braking prior to such powertrain oscillations.

The illustrated embodiment depicts the vehicle 12 as a battery electric vehicle (BEV), which is an all-electric vehicle propelled by an electric motor 18 without assistance from an internal combustion engine. The motor 18 receives electrical power and provides output mechanical power. The motor 18 also functions as a generator for converting mechanical power into electrical power. The vehicle 12 has a powertrain 20 that includes the motor 18 and a gearbox 22. The gearbox 22 adjusts the output torque and speed of the motor 18 by a predetermined gear ratio. A pair of half-shafts 23 extend from the gearbox 22 to a pair of driven wheels 24, which are depicted as front wheels in FIG. 1. In at least one embodiment, a disengagement mechanism, such as a clutch 25 is connected between the gearbox 22 and the half-shafts 23.

Although illustrated and described in the context of a BEV, it is understood that embodiments of the vehicle system 10 may be implemented on other types of vehicles, such as rear wheel drive vehicles, all-wheel drive vehicles, and hybrid vehicles that are powered by an internal combustion engine in addition to one or more electric machines (e.g., hybrid electric vehicles (HEVs), full hybrid electric vehicles (FHEVs) and plug-in hybrid electric vehicles (PHEVs), etc.).

The vehicle 12 includes an energy storage system 26 for storing and controlling electrical energy. A high voltage bus 28 electrically connects the motor 18 to the energy storage system 26 through an inverter 30. The energy storage system 26 includes a main battery 32 and a battery energy control module (BECM) 34, according to one or more embodiments. The main battery 32 is a high voltage battery that is capable of supplying electrical power to operate the motor 18. The main battery 32 also receives electrical power from the motor 18, when the motor 18 is operating as a generator. The inverter 30 converts the direct current (DC) power supplied by the main battery 32 to alternating current (AC) power for operating the motor 18. The inverter 30 also converts alternating current (AC) provided by the motor 18, when acting as a generator, to DC for charging the main battery 32. The main battery 32 is a battery pack made up of several battery modules (not shown), where each battery module contains a plurality of battery cells (not shown). The BECM 34 acts as a controller for the main battery 32. The BECM 34 also includes an electronic monitoring system that manages temperature and state of charge of each of the battery cells. Other embodiments of the vehicle 12 contemplate different types of energy storage systems, such as capacitors and fuel cells (not shown).

The powertrain 20 includes a transmission control module (TCM) 36 for controlling the motor 18 and the inverter 30. The TCM 36 monitors, among other things, the position, speed, and power consumption of the motor 18 and provides output signals corresponding to this information to other vehicle systems (e.g., the vehicle controller 14). The TCM 36 and the inverter 30 convert the direct current (DC) voltage supply by the main battery 32 into alternating current (AC) signals that are used to control the motor 18.

The vehicle controller 14 communicates with other vehicle systems and controllers for coordinating their function. Although it is shown as a single controller, the vehicle controller 14 may include multiple controllers that may be used to control multiple vehicle systems according to an overall vehicle system control (VSC) logic, or software. For example, the vehicle controller 14 may be a powertrain control module (PCM) having a portion of the VSC software embedded within a module. The vehicle controller 14 generally includes any number of microprocessors, ASICs, ICs, memory (e.g., FLASH, ROM, RAM, EPROM and/or EEPROM) and software code to co-act with one another to perform a series of operations. The vehicle controller 14 includes predetermined data, or "look up tables" that are stored within the memory, and based on calculations and test data. The vehicle controller 14 communicates with other controllers (e.g., TCM 36, BECM 34) over a hardline vehicle connection using a common bus protocol (e.g., CAN).

A user interface 38 communicates with the vehicle controller 14 for receiving information regarding the vehicle 12 and its surroundings, and conveys this information to the driver. The user interface 38 includes a number of interfaces, such as gauges, indicators, and displays (not shown). In one or more embodiments, the user interface 38 also includes a controller (not shown) for communicating with the vehicle controller 14 and external devices, such as a computer or cellular phone in one or more embodiments. The vehicle controller 14 provides output to the user interface 38, such as a status of the powertrain 20 or the energy storage system 26, which is conveyed visually to the driver.

The vehicle 12 includes a climate control system 40 for heating and cooling various vehicle components and a passenger compartment (not shown). The climate control system 40 includes a high voltage positive temperature coefficient (PTC) electric heater 42 and a high voltage electric HVAC compressor 44, according to one or more embodiments. The PTC heater 42 and HVAC compressor 44 are used to heat and cool fluid, respectively, that circulates to the powertrain 20 and to the main battery 32. Both the PTC heater 42 and the HVAC compressor 44 may draw electrical energy directly from the main battery 32. The climate control system 40 may also include a climate controller (not shown) for communicating with the vehicle controller 14 over the CAN bus. The on/off status of the climate control system 40 is communicated to the vehicle controller 14, and can be based on, for example, the status of an operator actuated switch, or the automatic control of the climate control system 40 based on related functions, such as window defrost. In other embodiments, the climate control system 40 is configured for heating and cooling air (e.g., existing vehicle cabin air) rather than fluid, and circulating the air through the main battery 32 and/or the powertrain 20.

The vehicle 12 includes a secondary low voltage (LV) battery 46, such as a 12-volt battery, according to one or more embodiment. The secondary battery 46 may be used to power various vehicle accessories such as a cooling pump, fans, electric steering, electric braking and headlights and the like, which are collectively referred to herein as accessories 48. A DC-to-DC converter 50 is electrically connected between the main battery 32 and the LV battery 46. The DC-to-DC converter 50 adjusts, or "steps down" the voltage level to allow the main battery 32 to charge the LV battery 46. A low voltage bus electrically connects the DC-to-DC converter 50 to the LV battery 46 and the accessories 48.

The vehicle 12 includes an AC charger 52 for charging the main battery 32. An electrical connector connects the AC charger 52 to an external power supply (not shown) for receiving AC power. The AC charger 52 includes power electronics used to invert, or "rectify" the AC power received from the external power supply to DC power for charging the main battery 32. The AC charger 52 is configured to accommodate one or more conventional voltage sources from the external power supply (e.g., 110 volt, 220 volt, etc.). The external power supply may include a device that harnesses renewable energy, such as a photovoltaic (PV) solar panel, or a wind turbine (not shown).

Also shown in FIG. 1 are simplified schematic representations of a driver controls system 54 and a navigation system 56. The driver controls system 54 includes acceleration and gear selection (shifting) systems (all not shown). The acceleration system includes an accelerator pedal having one or more sensors, which provide information such as a driver request for vehicle propulsion (drive torque request) to the vehicle controller 14. The gear selection system includes a shifter for manually selecting a gear setting of the gearbox 22. The gear selection system may include a shift position sensor for providing shifter selection information (e.g., PRNDL) to the vehicle controller 14. The navigation system 56 may include a navigation display, a global positioning system (GPS) unit, a navigation controller and inputs (all not shown) for receiving destination information or other data from a driver. These components may be unique to the navigation system 56 or shared with other systems. The navigation system 56 may also communicate distance and/or location information associated with the vehicle 12, its target destinations, or other relevant GPS waypoints.

The braking system 16 provides friction braking of the vehicle 12. The braking system includes a brake pedal 58 for receiving an input force from the driver. The brake pedal 58 is coupled to a brake booster 60, which multiplies the braking force provided by the brake pedal 58. A master cylinder 62 is attached to the booster 60 for receiving a booster output force. The master cylinder 62 includes a cylinder body and a fluid reservoir, both containing a non-compressible brake fluid (not shown). When subjected to the booster output force, a piston translates within the cylinder body, displacing the brake fluid to create hydraulic brake pressure. A pair of hydraulic circuits 64 are each connected to the cylinder body for receiving the brake pressure. Each circuit 64 splits into two brake lines to form a total of four brake lines L1, L2, L3 and L4. Each brake line L1, L2, L3 and L4 extends to a brake caliper that is mounted to one of the wheels, for applying a frictional braking torque to the corresponding wheel for decelerating the vehicle.

The braking system 16 is also configured for electrically actuated friction braking according to one or more embodiments. The braking system 16 includes a brake pedal sensor 66 and a brake controller 68. The brake pedal sensor 66 is connected to the brake pedal 58 and provides an input signal (BPP) to the brake controller 68 that corresponds to a brake pedal position. The BPP signal is indicative of a driver request for brake torque (brake torque request). The brake controller 68 also receives input that corresponds to an accelerator pedal position. The brake controller 68 determines a total brake torque value based on the brake pedal position and the accelerator pedal position. The brake controller 68 communicates with the vehicle controller 14 to coordinate regenerative braking and friction braking. The booster 60 includes an actuator 70 for adjusting the amount of internal pressure within booster 60. The booster 60 also includes a pressure sensor 72 that measures pressure within the booster 60 and provides an input signal (PRES) to the brake controller 68 that corresponds to the internal booster pressure. The braking system 16 includes additional sensors (not shown) for measuring pressure within the master cylinder 62, the brake lines (L1, L2, L3 and L4) and/or the brake calipers. These additional sensors provide input signals (not shown) to the brake controller 68 that correspond to the measured pressure values, according to one or more embodiments. Thus, the brake controller 68 may control the amount of friction brake torque applied to each wheel, by controlling the actuator 70. The braking system 16 may also be configured to allow the brake pedal 58 to mechanically adjust the amount of pressure within the booster under certain vehicle conditions (e.g., during rapid deceleration or low available electrical power).

The brake controller 68 is also configured to modulate friction braking to prevent locking of the brakes. By modulating or "pulsing" the hydraulic pressure within the brake lines L1, L2, L3, and L4 the brake controller provides antilock braking (ABS) functionality, which prevents locking of the brakes, and reduces stopping distance of the vehicle 12. A wheel speed sensor 74 is attached to each wheel, such as driven wheels 24, and provides an input signal ($\omega_{F1}$, $\omega_{F2}$, $\omega_{R1}$, $\omega_{R2}$) to the brake controller 68. The brake controller 68 analyzes the wheel speed signals to determine when wheels are 'locked' (not rotating) or 'slipping' (rotating slower than other wheels) to control ABS.

The brake controller 68 communicates with the vehicle controller 14 to coordinate regenerative braking and friction braking. The brake controller 68 provides an input signal to the vehicle controller 14 that corresponds to a total brake torque value. The vehicle controller 14 then compares the total brake torque value to other information to determine a regenerative brake torque value and a friction brake torque value, where the sum of the regenerative brake torque value and the friction brake torque value is approximately equal to the total brake torque value. For example, in one embodiment the vehicle controller 14 receives other input, such as vehicle speed, that is indicative of the amount of available regenerative torque. The vehicle controller 14 also receives input that is indicative of current status of the main battery 32. Based on this input, the vehicle controller 14 then determines a regenerative brake torque value to achieve the total brake torque value, without overcharging the main battery 32. The vehicle controller 14 provides the regenerative brake torque value to the TCM 36, which in turn controls the motor 18 to provide regenerative braking. The vehicle controller also provides the friction brake torque value to the brake controller 68, which in turn controls the actuator 70 to provide friction braking.

In one or more embodiments, the braking system 16 is configured to provide compression braking of the vehicle. Compression braking represents the frictional losses within an engine of a conventional vehicle, when a driver releases the accelerator pedal. Similarly, the braking system provides a total brake torque value when the accelerator pedal is released, even if the brake pedal is not depressed. The vehicle controller 14 then compares the total brake torque value to other information to determine a regenerative brake torque value and a friction brake torque value.

The vehicle 12 utilizes regenerative braking as the primary braking source, and supplements with friction braking when there is insufficient available regenerative brake torque to satisfy the total brake torque. Regenerative braking recharges the main battery 32 and recovers much of the energy that would otherwise be lost as heat during friction braking. Therefore regenerative braking improves the overall efficiency or fuel economy of the vehicle as compared to vehicles that are only configured for friction braking.

Interactions between friction braking components, the powertrain 20 and the road surface can result in deflections in the powertrain 20 (i.e., powertrain oscillations). Minor powertrain oscillations are not perceptible to the driver. However, during regenerative braking, such powertrain oscillations may be amplified because the motor 18 is providing additional energy to the powertrain 20. Powertrain oscillations are further amplified when regenerative braking coincides with other vehicle events such as wheel slip, hard braking or ABS braking, rough road conditions and high total braking Such powertrain oscillations can cause unpleasant noise and vibration, and can damage powertrain components over time. Many prior art vehicles (hybrids and non-hybrids) include a clutch and/or differential, which reduces powertrain oscillation. However, such structural components decrease the overall efficiency of a powertrain.

Prior art HEVs and BEVs include vehicle systems (not shown) that include reactive strategies to reduce regenerative braking after powertrain oscillation is detected. For example, some prior art systems reduce regenerative braking in response to receiving an ABS Flag signal, which indicates that ABS braking is active, and powertrain oscillation is likely occurring.

The vehicle system 10 of the present disclosure provides advantages over the prior art by providing one or more proactive strategies to reduce regenerative braking before powertrain oscillation occurs. The vehicle system 10 mitigates powertrain oscillation by predicting future powertrain oscillation based on input signals and reducing regenerative braking prior to the onset of such powertrain oscillation. For example, in situations that would trigger an ABS braking event, the vehicle system 10 may begin reducing regenerative braking prior to the ABS event and before an ABS Flag signal is received. The vehicle system 10 may reduce or disable regenerative braking prior to powertrain oscillation. However, as mentioned above, regenerative braking improves the overall efficiency and fuel economy of the vehicle 12. Therefore the vehicle system 10 quickly restores full regenerative braking when vehicle conditions no longer indicate impending powertrain oscillation.

Reducing regenerative braking may not eliminate powertrain oscillation in all vehicle conditions. However, by reducing regenerative braking, there is less energy in the powertrain, which allows other vehicle control systems to actively dampen any powertrain oscillation. One example of such an active damping system is disclosed in U.S. Pat. No. 8,525,467 to Gee et al., which is incorporated by reference in its entirety herein.

Referring to FIGS. 1-9, the vehicle system 10 includes one or more algorithms or methods for mitigating powertrain oscillation. These methods may be implemented individually or in combination with one or more other methods. The vehicle system 10 includes the vehicle controller 14, TCM 36 and brake controller 68; each of which generally include any number of microprocessors, ASICs, ICs, memory (e.g., FLASH, ROM, RAM, EPROM and/or EEPROM) which co-act with software code to perform the operations of the method(s).

Figure 2:
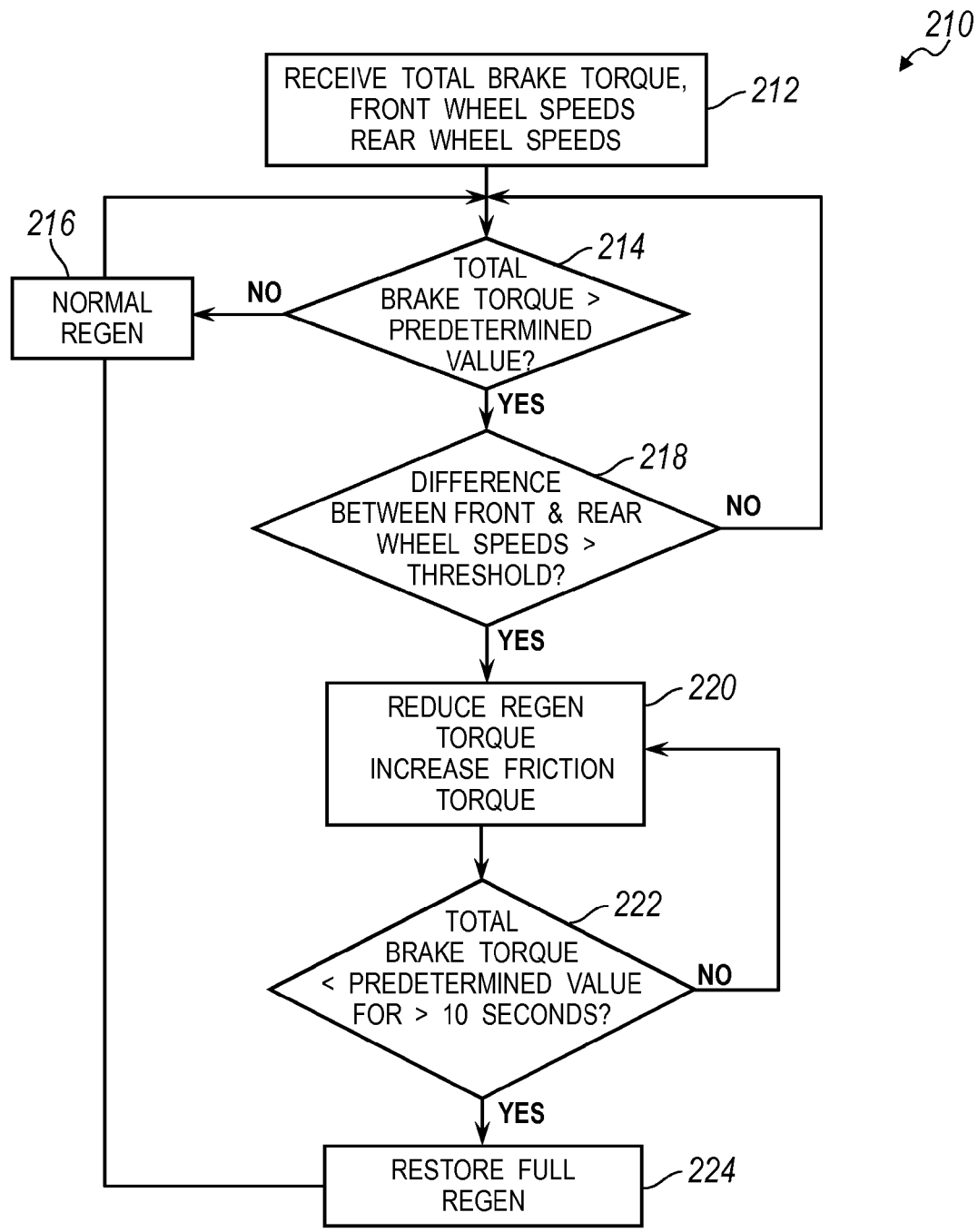
FIG. 2 is a flow chart illustrating a method for mitigating powertrain oscillation associated with a wheel slip event, according to one or more embodiments.

With reference to FIG. 2, a method for mitigating powertrain oscillation associated with a wheel slip event is illustrated in accordance with one or more embodiments and generally referenced by numeral 210. Generally a wheel slip event occurs when one wheel rotates faster than another wheel on a vehicle. A brake controller may initiate ABS braking in response to a wheel slip event. ABS braking while the vehicle is also regenerative braking may result in powertrain oscillation.

The method 210 provides operations for mitigating powertrain oscillations by monitoring input indicative of the wheel slip event and for reducing regenerative braking prior to the onset of powertrain oscillations associated with the wheel slip event. In operation 212, the vehicle system 10 receives the brake pedal position (BPP) signal which corresponds to a brake torque request, along with the front wheel speed signals and the rear wheel speed signals. A total brake torque value is determined based on the brake torque request.

In operation 214, the total brake torque value is compared to calibrated or predetermined data to determine if the total brake torque is greater than a predetermined torque value. In one or more embodiments, the predetermined torque value is between 2,000 and 3,000 Nm. In one embodiment, the predetermined torque value is approximately 2,500 Nm. If the determination at operation 214 is negative, then the vehicle system 10 proceeds to operation 216 and applies regenerative braking and friction braking to normal torque limits. If the determination at operation 214 is positive, the vehicle system proceeds to operation 218.

In operation 218, the vehicle controller 14 calculates a difference between the front wheel speed and the rear wheel speed. If this difference exceeds a predetermined threshold value, then vehicle controller 14 determines that a wheel slip event is occurring. In one or more embodiments, the predetermined threshold value is between eight and twenty rad/s. In one embodiment, the predetermined threshold value is approximately ten rad/s. In other embodiments, the vehicle controller 14 determines that a wheel slip event is occurring when the difference between the front wheel speed and the rear wheel speed is greater than five percent of the larger wheel speed.

In operation 220 the vehicle system 10 reduces regenerative braking and increases friction braking in response to a wheel slip event. The vehicle controller 14 coordinates with the TCM 36 to reduce the regenerative torque provided by the motor 18. While reducing regenerative torque, the vehicle controller 14 also coordinates with the brake controller 68 to increase the friction torque so that the sum of the regenerative torque and the friction torque is equal to the total brake torque. In one or more embodiments, the method 210 includes an additional operation of comparing both front wheel speeds to each other, and only allowing a reduction of regenerative brake torque if both wheel speeds "agree", or are within a calibrated tolerance to avoid false activation.

The method 210 also provides operations for restoring regenerative braking once the wheel slip event has ended. In operation 222, the vehicle system 10 determines if the total brake torque is less than a predetermined torque value for longer than a predetermined period of time. In one or more embodiments, the predetermined torque value is between five-hundred and zero Nm and the predetermined period of time is between one and five seconds. Such driver feedback is indicative of more stable driving conditions (e.g., no wheels are slipping, or rotating slower than the other wheels during a braking event). If the determination at operation 222 is positive, then the vehicle controller 14 determines that the wheel slip event has ended and proceeds to operation 224 and restores full regenerative braking.

Figure 3:
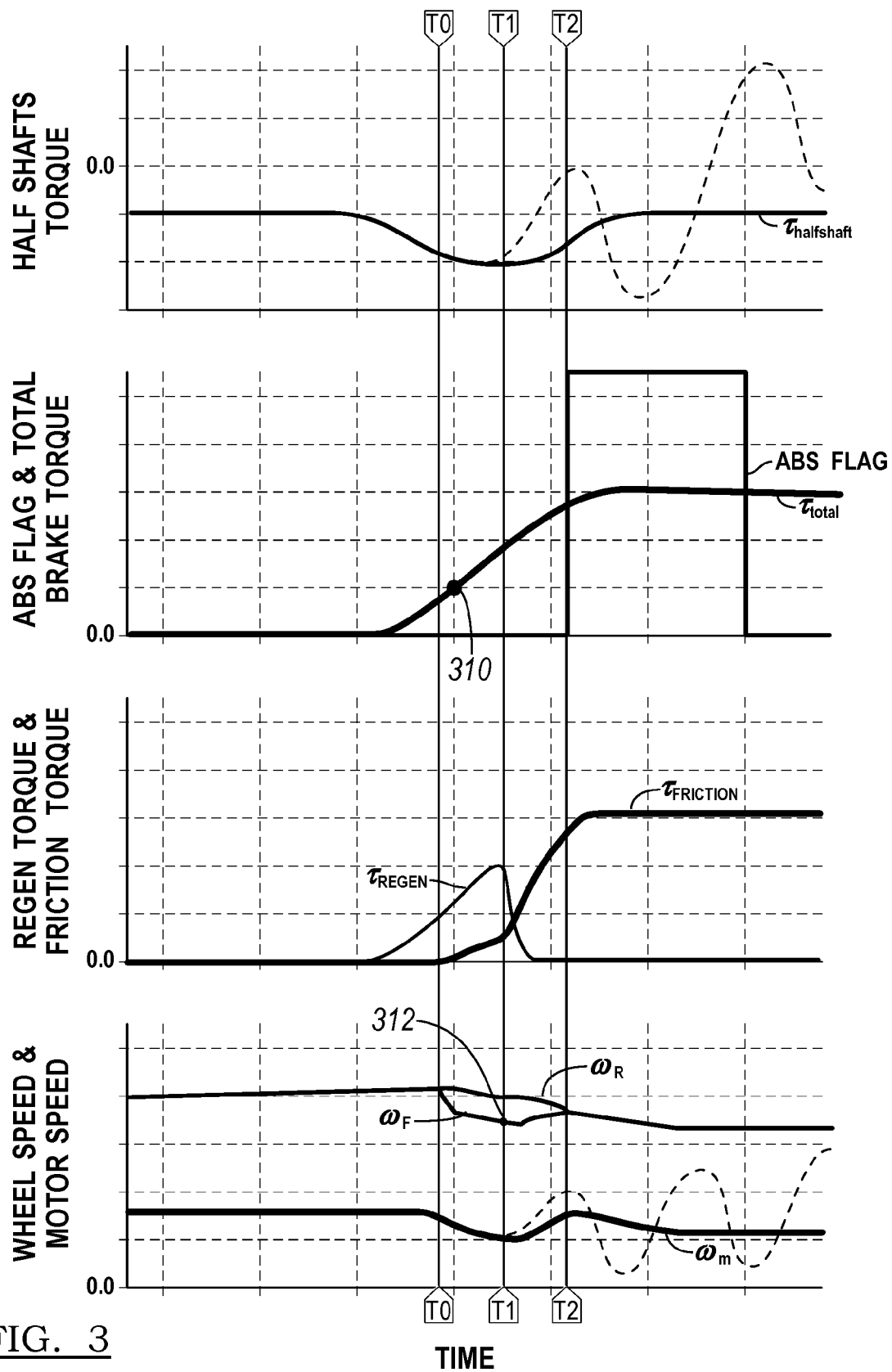
FIG. 3 is a graph illustrating how various parameters of the vehicle system of FIG. 1 change over time due to the method of FIG. 2.

FIG. 3 illustrates the impact of the method 210 for mitigating powertrain oscillations during a wheel slip event. FIG. 3 includes four graphs of data taken over a common period of time. At time ($t_0$) the front wheels begin to slip. At time ($t_1$) the vehicle system 10 begins reducing regenerative torque, and at time ($t_2$) the front wheels stop slipping. Waveforms shown in solid line illustrate the impact on the vehicle system 10 when the method 210 is active during a wheel slip event. The waveforms shown in dashed line are for illustrative purposes and illustrate powertrain oscillation when the method 210 is not active. The waveforms are based on both measured and calculated data.

A first graph illustrates the torque about the half-shafts and includes a waveform ($T_{halfshafts}$) of the half-shaft torque values. The $T_{halfshafts}$ waveform may be generated based on actual torque measurement data or may be calculated values based on other measurement data (e.g., motor current). A second graph relates to brake torque that is requested by the driver and includes a waveform ($T_{total}$) of the total brake torque values. The second graph also illustrates the ABS flag, which indicates when the brake controller 68 has initiated ABS braking. A third graph illustrates the regenerative brake torque (regenerative torque) and the friction brake torque (friction torque) and includes corresponding waveforms ($T_{regen}$ and $T_{friction}$). As described above with reference to FIG. 1, the vehicle controller 14 determines the distribution between regenerative torque and friction torque to satisfy the total brake torque. The $T_{regen}$ and $T_{friction}$ waveforms may be generated based on data provided by the vehicle controller 14. Alternatively the waveforms may be based on actual torque measurements. A fourth graph illustrates the front wheel speed, the rear wheel speed and the motor speed and includes corresponding waveforms ($\omega_F$, $\omega_R$ and $\omega_m$). These speed waveforms may be generated based on actual speed measurements. For clarity only one waveform is illustrated for each of the front wheel speed ($\omega_F$) and the rear wheel speed ($\omega_R$) and it is assumed that the front wheels are both rotating at the same speed, and the rear wheels are each rotating at the same speed.

The vehicle system 10 utilizes primarily regenerative braking for low braking conditions. Once the total brake torque value exceeds a predetermined torque value, the vehicle system 10 utilizes both regenerative braking and friction braking. This predetermined torque value is indicated by point 310 in FIG. 3. Once the $T_{total}$ waveform exceeds this predetermined torque value at point 310, the $T_{friction}$ waveform illustrated on the third graph increases from zero.

In the illustrated embodiment, the wheel speed difference threshold value that is indicative of a wheel slip event is ten rad/s. At time ($t_0$) the front wheels begins to slip, and the front wheel speed waveform ($\omega_F$) decreases with respect to the rear wheel speed waveform ($\omega_R$). At point 312 the difference between the wheel speed values ($\omega_R - \omega_F$) is approximately twelve rad/s, which is greater than the predetermined threshold value (ten rad/s), and the vehicle system 10 begins reducing regenerative braking. Although the method 210 describes a comparison between front and rear wheel speeds, the method is also applicable to rear wheel drive vehicles and may be interpreted as analyzing the slip of the driven wheels relative to the non-driven wheels.

Between time ($t_1$ and $t_2$) the vehicle system 10 reduces regenerative torque at a controlled rate ("ramped out") while increasing the friction torque at a controlled rate ("ramped in") to make the transition generally imperceptible to the driver. After time ($t_2$) the front wheels are no longer slipping and are once again rotating at the same speed as the rear wheels. Although the illustrated embodiment depicts disabling regenerative braking by reducing the regenerative torque to zero; other embodiments contemplate reducing the regenerative torque to a predetermined intermediate value that is greater than zero.

Figure 4:
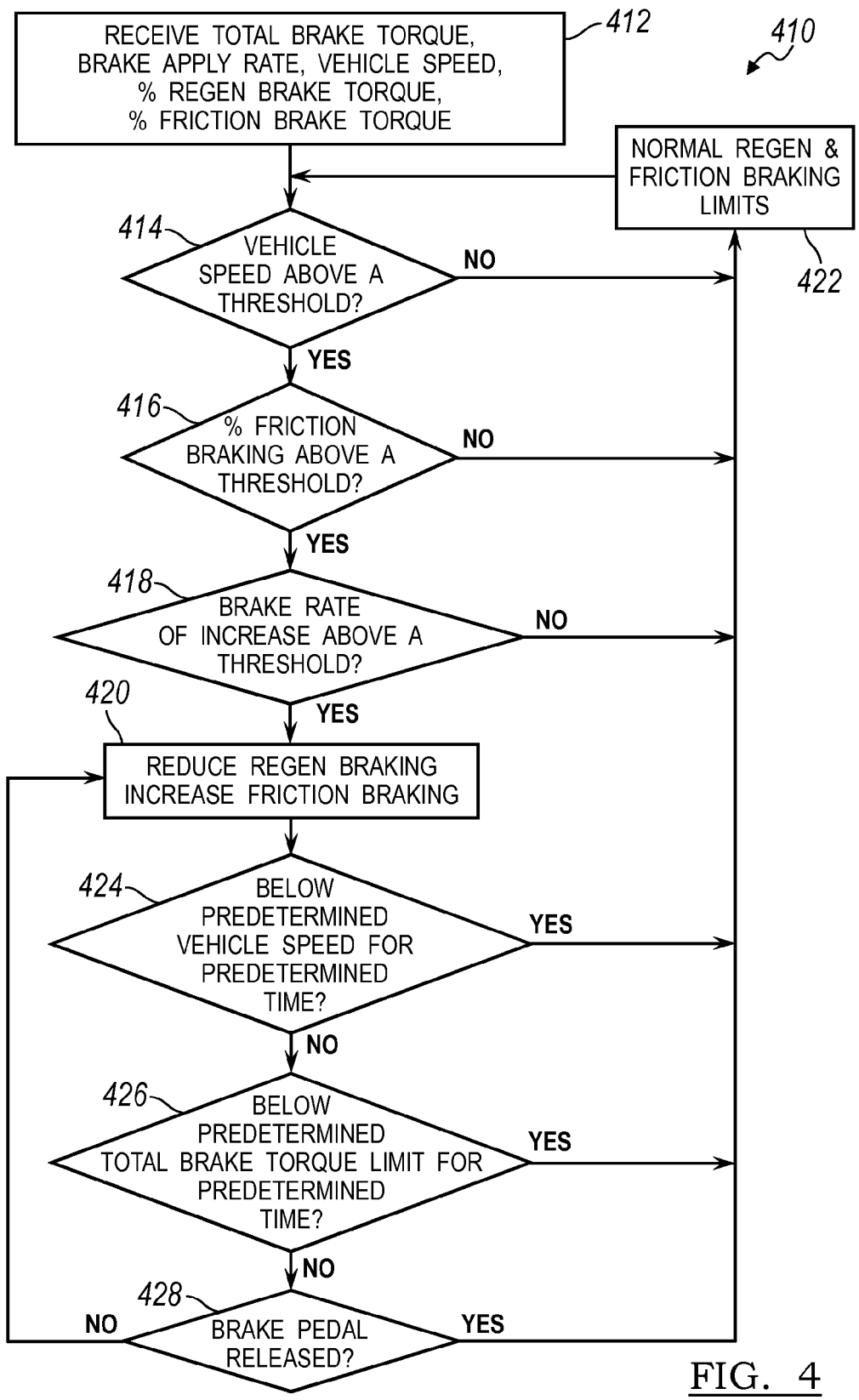
FIG. 4 is a flow chart illustrating a method for mitigating powertrain oscillation associated with a hard braking event, according to one or more embodiments.

With reference to FIG. 4, a method for mitigating powertrain oscillation associated with a hard braking event is illustrated in accordance with one or more embodiments and generally referenced by numeral 410. Generally a hard braking event occurs when a driver rapidly applies a brake pedal. The brake controller 68 may initiate ABS braking in response to a hard braking event. ABS braking while the vehicle is also regenerative braking may result in powertrain oscillation.

The method 410 provides operations for mitigating powertrain oscillations by monitoring input indicative of the hard braking event and for reducing regenerative braking prior to the onset of powertrain oscillations associated with the hard braking event. In operation 412, the vehicle system 10 receives input that is indicative of the total brake torque, the vehicle speed, a brake apply rate, a percent (%) regenerative torque, and a % friction torque. The total brake torque value is determined based on the brake pedal position and the accelerator pedal position. The brake apply rate may be calculated based on a change in the total brake torque value over time. The % regenerative torque and % friction torque may be calculated based on a comparison of the total brake torque to the regenerative torque value and to the friction torque value, respectively.

In operation 414, the vehicle speed is compared to predetermined data to determine if the vehicle speed is above a threshold speed. In one or more embodiments, the threshold speed is between fifteen km/hr and twenty-five km/hr. In operation 416, the % friction torque is compared to predetermined data to determine if it is above a nominal threshold percentage, which indicates that friction braking is active. In one or more embodiments, the threshold percentage is between ten and twenty percent friction braking.

In operation 418, the brake apply rate is compared to predetermined data to determine if it is above a threshold rate for a predetermined period of time. In one or more embodiments, the threshold rate is between 10,000 and 20,000 Nm/s, and the predetermined period of time is between fifty and five-hundred ms. In one embodiment the threshold rate is approximately 15,000 Nm and the predetermined period of time is approximately one-hundred ms.

If the determinations at operations 414, 416 and 418 are all positive, then the vehicle system 10 determines that a hard braking event is occurring and that there is impending powertrain oscillation. In operation 420 the vehicle system 10 reduces regenerative braking and increases friction braking in response to such a hard braking event.

Drivers have different driving habits, and some may apply the brake pedal more rapidly than others. Operations 414 and 416 limit the reduction of regenerative torque to situations where powertrain oscillation is likely; such as at high vehicle speed and at least minimal friction braking, along with a rapid brake apply. Thus, if the determination at operations 414, 416 or 418 is negative, the vehicle system 10 proceeds to operation 422 and applies regenerative braking and friction braking to normal limits.

The method 410 also provides operations for restoring regenerative braking once the hard braking event has ended. In operation 424 the vehicle system 10 determines if the vehicle speed is below a predetermined speed for a predetermined period of time. In one or more embodiments, the predetermined speed is between fifteen km/hr and twenty-five km/hr and the predetermined period of time is between one and five seconds.

Then in operation 426 the vehicle system 10 determines if the total brake torque is less than a predetermined torque value for longer than a predetermined period of time. In one or more embodiments, the predetermined torque value is between five-hundred and zero Nm and the predetermined period of time is between one and five seconds. In operation 428 the vehicle system 10 determines if the brake pedal 58 is released. In one or more embodiments, the vehicle system 10 evaluates the BPP signal provided by the brake pedal sensor 66 and determines that the brake pedal 58 is released if the BPP corresponds to a released pedal position.

Such vehicle speed and driver feedback is indicative of more stable driving conditions (e.g., no hard braking). If the determination at operation 424, 426 or 428 is positive, then the hard driving event has ended and the vehicle system 10 proceeds to operation 422 and restores full regenerative braking. However if the determination at operations 424, 426 and 428 are all negative, then the hard driving event is still present and the vehicle system 10 returns to operation 420 and continues to limit regenerative braking.

Figure 5:
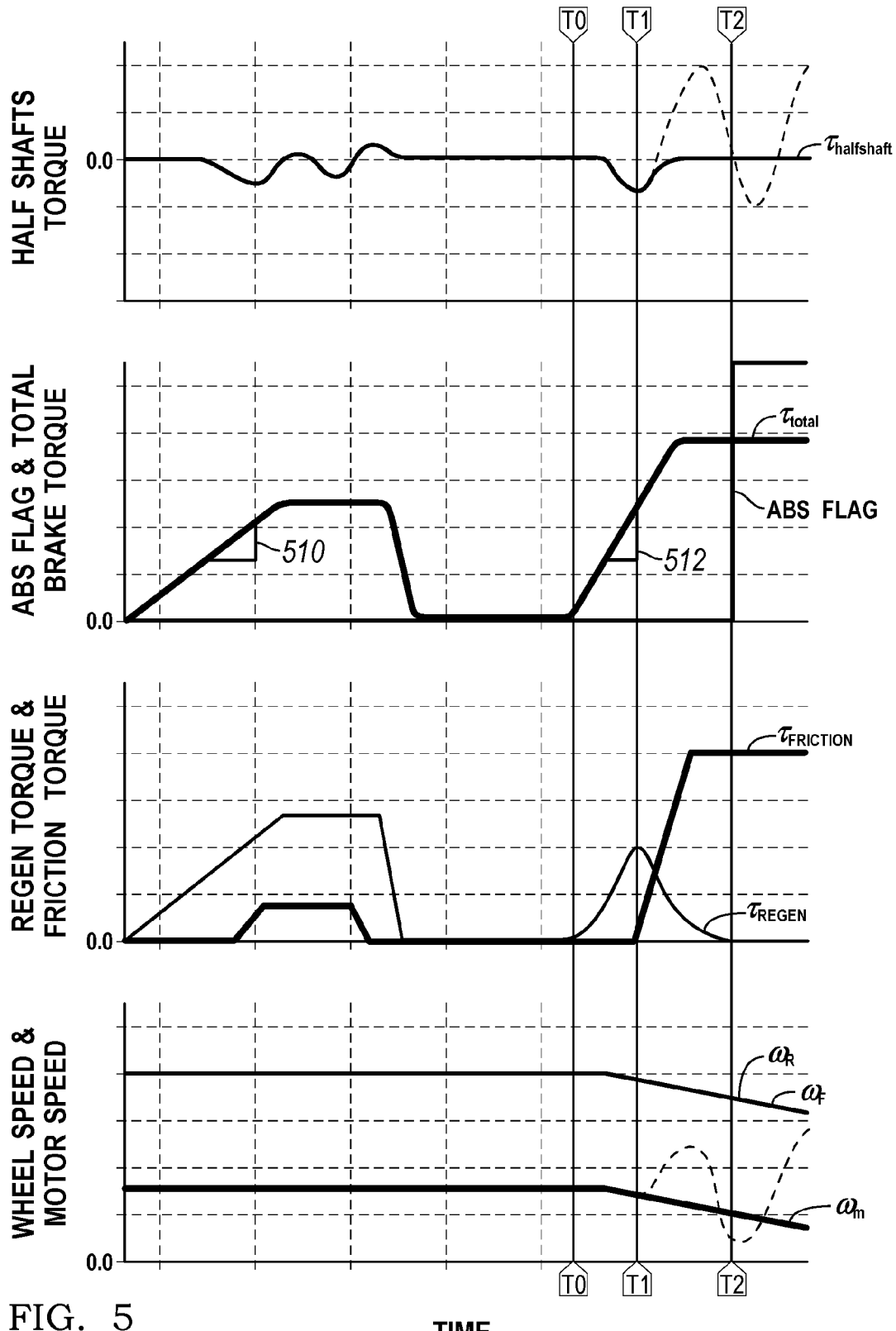
FIG. 5 is a graph illustrating how various parameters of the vehicle system of FIG. 1 change over time due to the method of FIG. 4.

FIG. 5 illustrates the impact of the method 410 for mitigating powertrain oscillations during a hard braking event. FIG. 5 includes four graphs of data taken over a common period of time. At time ($t_0$) a driver begins applying the brake pedal at a high rate. At time ($t_1$) the vehicle system 10 begins reducing regenerative torque. At time ($t_2$) regenerative braking has been reduced. Waveforms shown in solid line illustrate the impact on the vehicle system 10 when the method 410 is active during a hard braking event. The waveforms shown in dashed line are for illustrative purposes and illustrate the powertrain oscillation when the method 410 is not active. The waveforms are based on both measured and calculated data. The graphs are arranged like those illustrated in FIG. 3, with a first graph illustrating $T_{halfshafts}$ a second graph illustrating $T_{total}$ and an ABS Flag signal, a third graph illustrating $T_{regen}$ and $T_{friction}$, and a fourth graph illustrating $\omega_F$, $\omega_R$ and $\omega_m$.

In the illustrated embodiment, the predetermined threshold rate that is indicative of a hard braking event is 15,000 Nm/s. Two separate braking cycles or "applies" are depicted by the waveform $T_{total}$ in FIG. 5. During the first braking cycle, the brake apply rate is less than the predetermined threshold rate of 15,000 Nm/s, and therefore not high enough to trigger the limited regenerative braking operations of the method 410. This low brake apply rate corresponds to the slope of the $T_{total}$ waveform at point 510 and is approximately 13,000 Nm/s. However, at time ($t_0$) the second braking cycle begins and the brake apply rate, as indicated by a slope of the $T_{total}$ waveform at point 512, is approximately 18,000 Nm/s, which is greater than the threshold rate of 15,000 Nm/s, and therefore the vehicle system 10 begins reducing regenerative braking.

Between time ($t_1$ and $t_2$) the vehicle system 10 reduces regenerative torque at a controlled rate ("ramped out") while increasing the friction torque at a controlled rate ("ramped in") to make the transition imperceptible to the driver. Although the illustrated embodiment depicts disabling regenerative braking by reducing the regenerative torque to zero; other embodiments contemplate reducing the regenerative torque to a predetermined intermediate value that is greater than zero.

Figure 6:
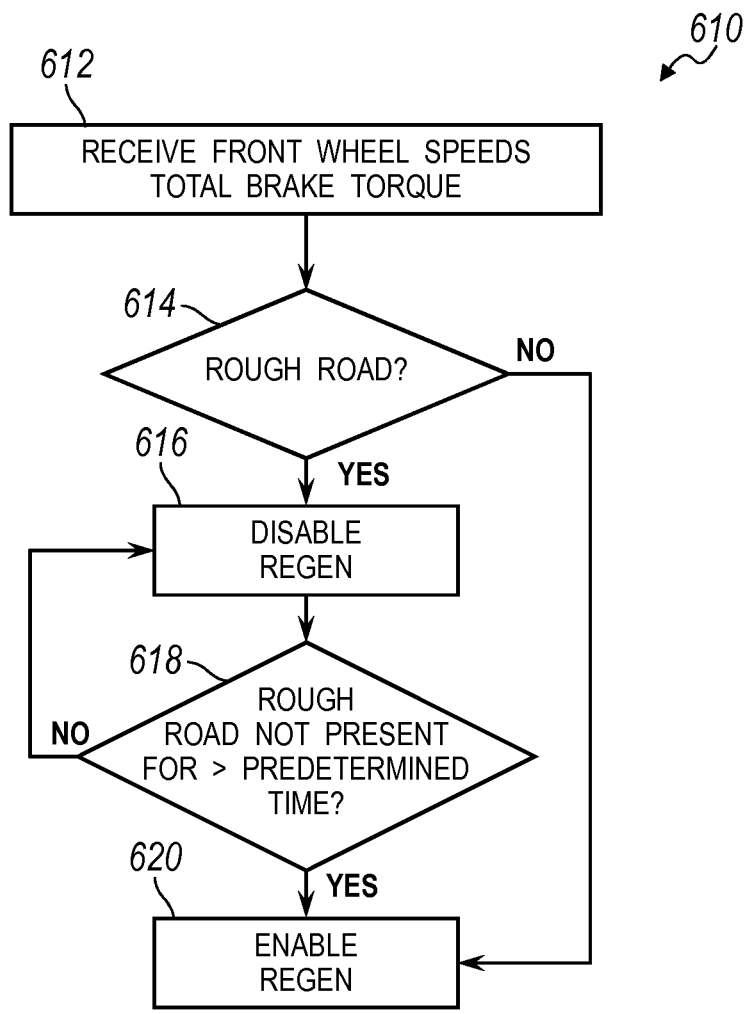
FIG. 6 is a flow chart illustrating a method for mitigating powertrain oscillation associated with a rough road condition, according to one or more embodiments.

With reference to FIG. 6, a method for mitigating powertrain oscillation associated with a rough road condition is illustrated in accordance with one or more embodiments and generally referenced by numeral 610. Generally a rough road condition occurs when a vehicle drives over a rough road (e.g., rumble strips on a highway) and the wheels vibrate. This vibration may result in perturbations or noise being present on the wheel speed signals. A brake controller may initiate ABS braking in response to a rough road condition. ABS braking while the vehicle is also regenerative braking may result in powertrain oscillation.

The method 610 provides operations for mitigating powertrain oscillations by monitoring input indicative of the rough road condition and reducing regenerative braking prior to the onset of powertrain oscillation associated with the rough road condition. In operation 612, the vehicle system 10 receives the brake pedal position (BPP) signal which corresponds to a brake torque request, along with the front wheel speed signals. A total brake torque value is determined based on the brake torque request. In operation 614, the front wheel speed signal is analyzed for the presence of noise as indicated by a high frequency component and/or a high amplitude component, which indicates a rough road condition. In one or more embodiments, a wheel speed signal having a high frequency component between five and twenty Hz or an amplitude between five and fifteen rad/s pk-pk, is indicative of a rough road condition. In another embodiment a wheel speed signal having a high frequency component greater than approximately eight Hz or an amplitude greater than approximately ten rad/s pk-pk, is indicative of a rough road condition. In operation 616 the vehicle system 10 reduces regenerative braking and increases friction braking in response to the determination of a rough road condition. The vehicle controller 14 coordinates with the TCM 36 to reduce the regenerative torque provided by the motor 18. While reducing regenerative torque, the vehicle controller 14 also coordinates with the brake controller 68 to increase the friction torque so that the sum of the regenerative torque and the friction torque is equal to the total brake torque. In one or more embodiments, the vehicle system 10 disables regenerative braking at operation 616 by reducing the regenerative brake torque to approximately zero Nm.

The method 610 also provides operations for restoring regenerative braking once the rough road condition has ended. In operation 618, the vehicle controller 14 determines if the rough road condition has not been present for longer than a predetermined period of time (e.g., ten seconds). If the determination at operation 618 is positive, then the vehicle controller 14 proceeds to operation 620 and enables full regenerative braking. If the determination at operation 618 is negative, the vehicle system 10 returns to operation 616 and maintains the reduced regenerative braking.

Figure 7:
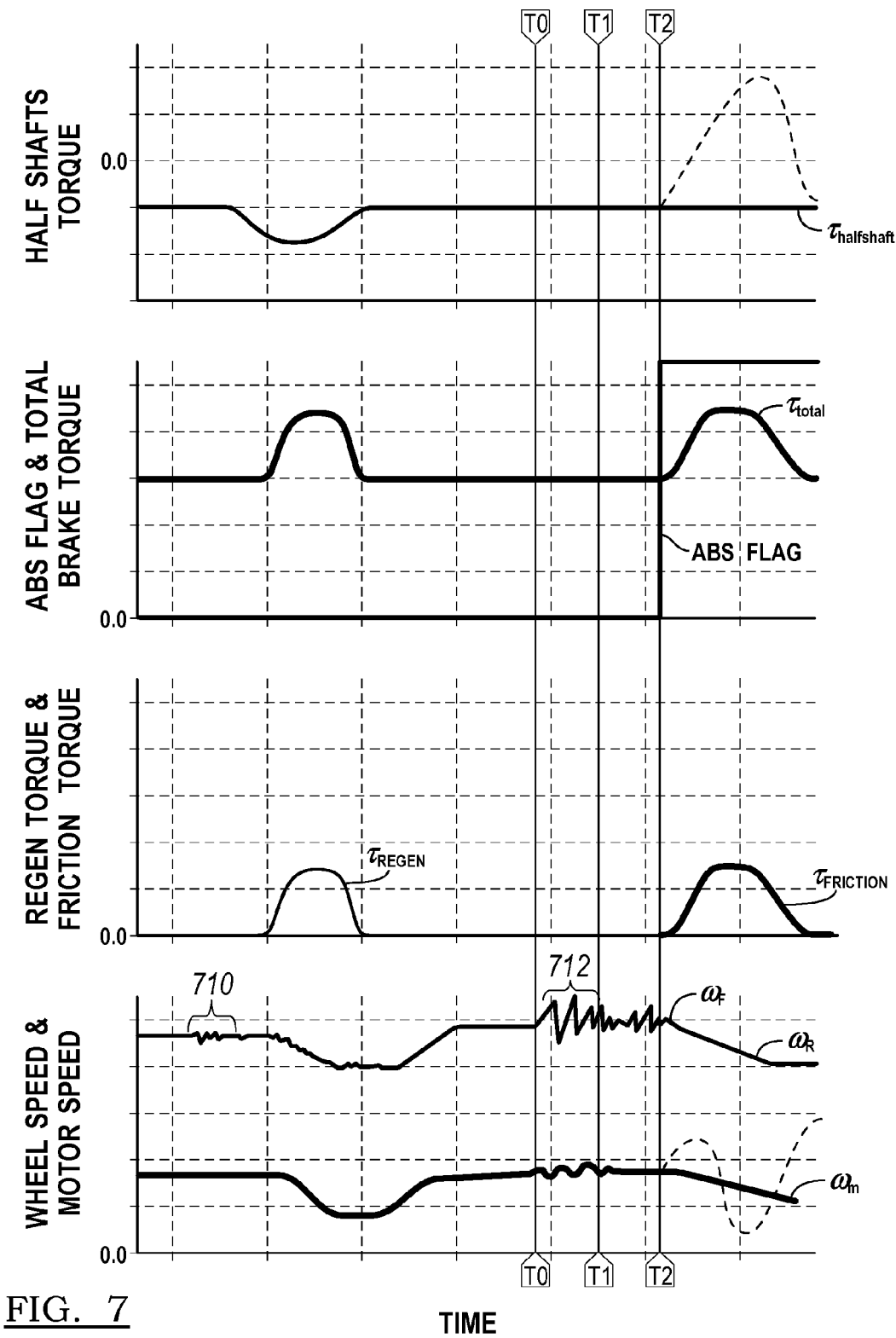
FIG. 7 is a graph illustrating how various parameters of the vehicle system of FIG. 1 change over time due to the method of FIG. 6.

FIG. 7 illustrates the impact of the method 610 for mitigating powertrain oscillations during a rough road condition. FIG. 7 includes four graphs of data taken over a common period of time. At time ($t_0$) a vehicle encounters a rough road condition. At time ($t_1$) the vehicle system determines that the vehicle has encountered a rough road condition and disables regenerative braking. At time ($t_2$) the driver applies the brake pedal and the vehicle system utilizes only friction braking to satisfy the total brake torque. Waveforms shown in solid line illustrate the impact on the vehicle system 10 when the method 610 is active during a rough road condition. The waveforms shown in dashed line are for illustrative purposes and illustrate the powertrain oscillation when the method 610 is not active. The waveforms are based on both measured and calculated data. The graphs are arranged like those illustrated in FIGS. 3 and 5 with a first graph illustrating $T_{halfshafts}$, a second graph illustrating $T_{total}$ and an ABS Flag signal, a third graph illustrating $T_{regen}$ and $T_{friction}$, and a fourth graph illustrating $\omega_F$, $\omega_R$ and $\omega_m$.

In the illustrated embodiment, the threshold frequency that is indicative of a rough road condition is eight Hz. Two separate drive cycles are depicted by the waveform $\omega_F$, in FIG. 7. During the first drive cycle, there are some perturbations or noise present on the $\omega_F$ waveform as referenced by numeral 710. However the frequency of this noise component at 710 is approximately three Hz, which is less than the threshold frequency and therefore not enough to trigger a rough road condition. Therefore the vehicle system 10 utilizes only regenerative braking to satisfy the total brake torque during the first drive cycle, as illustrated by the $T_{regen}$ waveform. However, at time ($t_0$) the second drive cycle begins and there is high frequency noise component present on the $\omega_F$ waveform of approximately twenty Hz, as referenced by numeral 712. The frequency of the $\omega_F$ waveform at 712 is higher than the threshold frequency (eight Hz) and therefore the vehicle system 10 determines that a rough road condition is present.

Between time ($t_1$ and $t_2$) the vehicle system 10 disables regenerative braking. At time ($t_2$), the vehicle system utilizes only friction braking to satisfy the total brake torque.

Although the illustrated embodiment depicts disabling regenerative braking, other embodiments contemplate limiting the regenerative torque to a predetermined intermediate value that is greater than zero.

Figure 8:
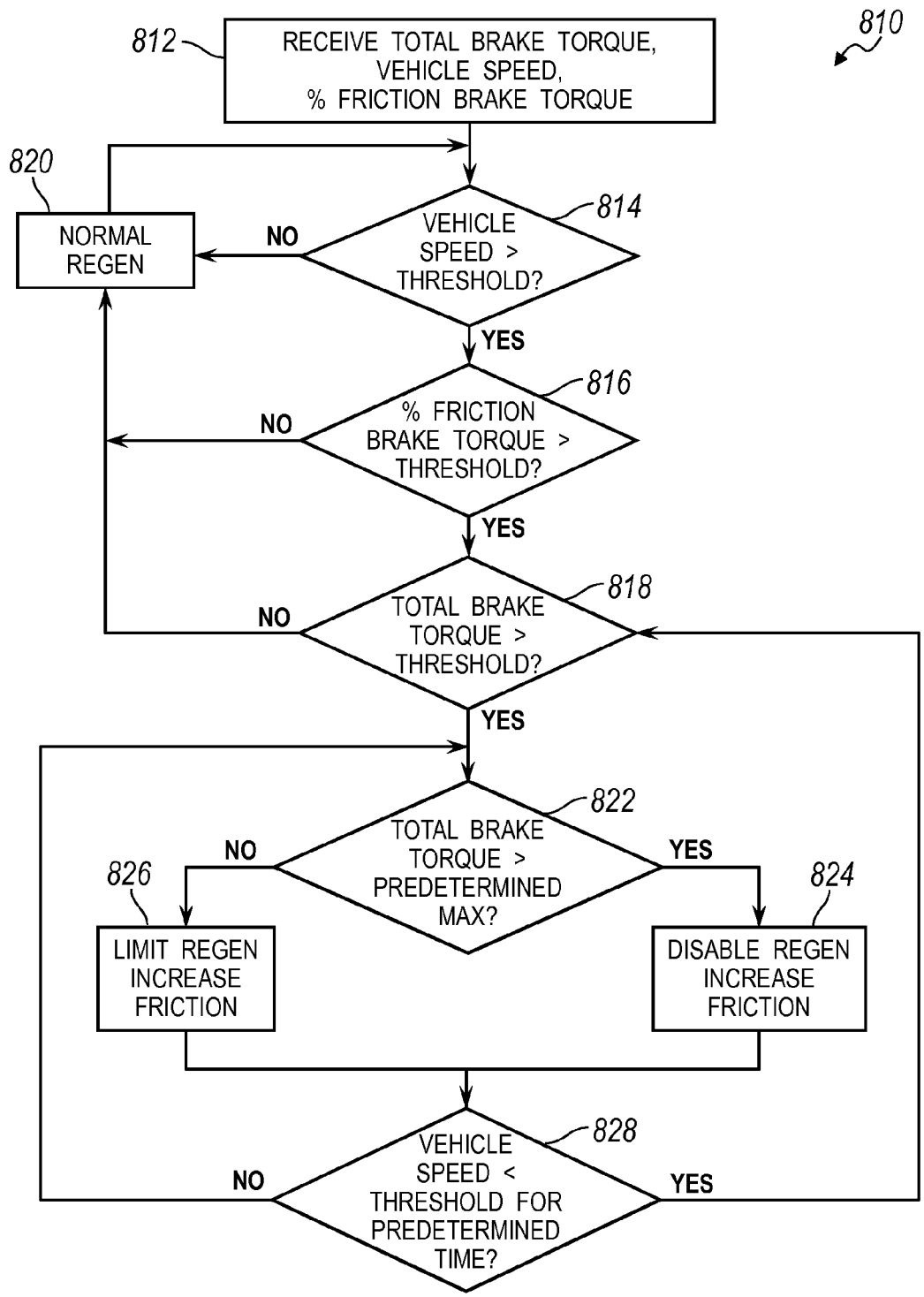
FIG. 8 is a flow chart illustrating a method for mitigating powertrain oscillation associated with a high total braking event, according to one or more embodiments.

With reference to FIG. 8, a method for mitigating powertrain oscillation associated with a high total braking event is illustrated in accordance with one or more embodiments and generally referenced by numeral 810. Generally a high total braking event occurs when a driver makes a high vehicle deceleration request. For example, a high vehicle deceleration request corresponds to a deceleration rate of approximately 0.5 g (−4.9 m/s$^2$). The brake controller 68 may initiate ABS braking in response to a hard braking event. ABS braking while the vehicle is also regenerative braking may result in powertrain oscillation.

The method 810 provides operations for mitigating powertrain oscillations by monitoring input indicative of the high total braking event and for reducing and/or disabling regenerative braking prior to the onset of powertrain oscillations associated with the high total braking event. In operation 812, the vehicle system 10 receives input that is indicative of the total brake torque, the vehicle speed, and calculations of a percent (%) friction torque.

In operation 814, the vehicle speed is compared to predetermined data to determine if the vehicle speed is above a threshold speed. In one or more embodiments, the threshold speed is between fifteen km/hr and twenty-five km/hr. Next in operation 816, the % friction torque is compared to predetermined data to determine if it is above a nominal threshold percentage, which indicates that friction braking is active. In one or more embodiments, the threshold percentage is between ten and twenty percent friction braking. In operation 818, the total brake torque is compared to predetermined data to determine if it is above a threshold value. In one or more embodiments the threshold value is between 2,000 and 3,000 Nm. In one embodiment the threshold value is approximately 2,500 Nm. If the determinations at operation 814, 816 or 818 is negative, then the vehicle system 10 determines that a high total braking event is not occurring and that there is no impending powertrain oscillation. The vehicle system 10 then proceeds to operation 820 and allows normal regenerative braking.

However, if the determination is positive at operations 814, 816 and 818 then the vehicle system 10 proceeds to operation 822 and determines whether it should limit regenerative braking or disable regenerative braking. In operation 822 the total brake torque value is compared to a predetermined maximum value. In one or more embodiments the predetermined maximum value is between 3,000 and 4,000 Nm. In one embodiment the predetermined maximum value is approximately 3,500 Nm. If the total brake torque value exceeds this maximum value, then the vehicle system 10 proceeds to operation 824 and disables regenerative braking, and increases friction braking. If the determination at operation 822 is negative, then the vehicle system 10 proceeds to operation 826 and limits regenerative braking, by reducing the regenerative brake torque to a predetermined value that is greater than zero, and increases friction braking. In one or more embodiments, the vehicle system 10 reduces the regenerative brake torque to a value between fifty and two-hundred Nm. In one embodiment the regenerative brake torque is limited to a value of approximately seven hundred Nm.

The total brake torque depends on vehicle mass and the size of the wheels. The total brake torque may be calculated using equation 1 as shown below:

$$T_{total} = m_{vehicle} * a * rad_{wheel}$$  Eq. 1 where: $T_{total}$ is the total brake torque,
$m_{vehicle}$ is the mass of the vehicle,
a is the deceleration of the vehicle, and
$rad_{wheel}$ is the wheel radius.

For example, with reference to operation 822, in one embodiment the predetermined maximum value corresponds to a vehicle deceleration of 0.5 g. Therefore the total brake torque to decelerate a 2,300 kg vehicle having a wheel radius of 0.31 m, at a deceleration rate of 0.5 g (0.5*−9.8 m/s$^2$) is approximately 3,500 Nm, using equation 1. Although the total brake torque values are described with reference to a passenger car having a mass of approximately 2,300 kg, other embodiments of the vehicle system 10 may be implemented in vehicles of various sizes, where the total brake torque values are adjusted based on the corresponding vehicle mass and wheel radius.

The method 810 also provides operations for restoring regenerative braking once the high total braking event has ended. In operation 828 the vehicle system 10 determines if the vehicle speed is below the threshold speed for a predetermined period of time. In one or more embodiments, the threshold speed is between fifteen km/hr and twenty-five km/hr and the predetermined period of time is between one and five seconds. If the determination at operation 828 is positive, then the vehicle system 10 returns to operation 818 to determine if the total brake torque is greater than the threshold value. However, if the determination at operation 828 is negative, then the high total braking event is still present and the vehicle system 10 returns to operation 822.

Figure 9:
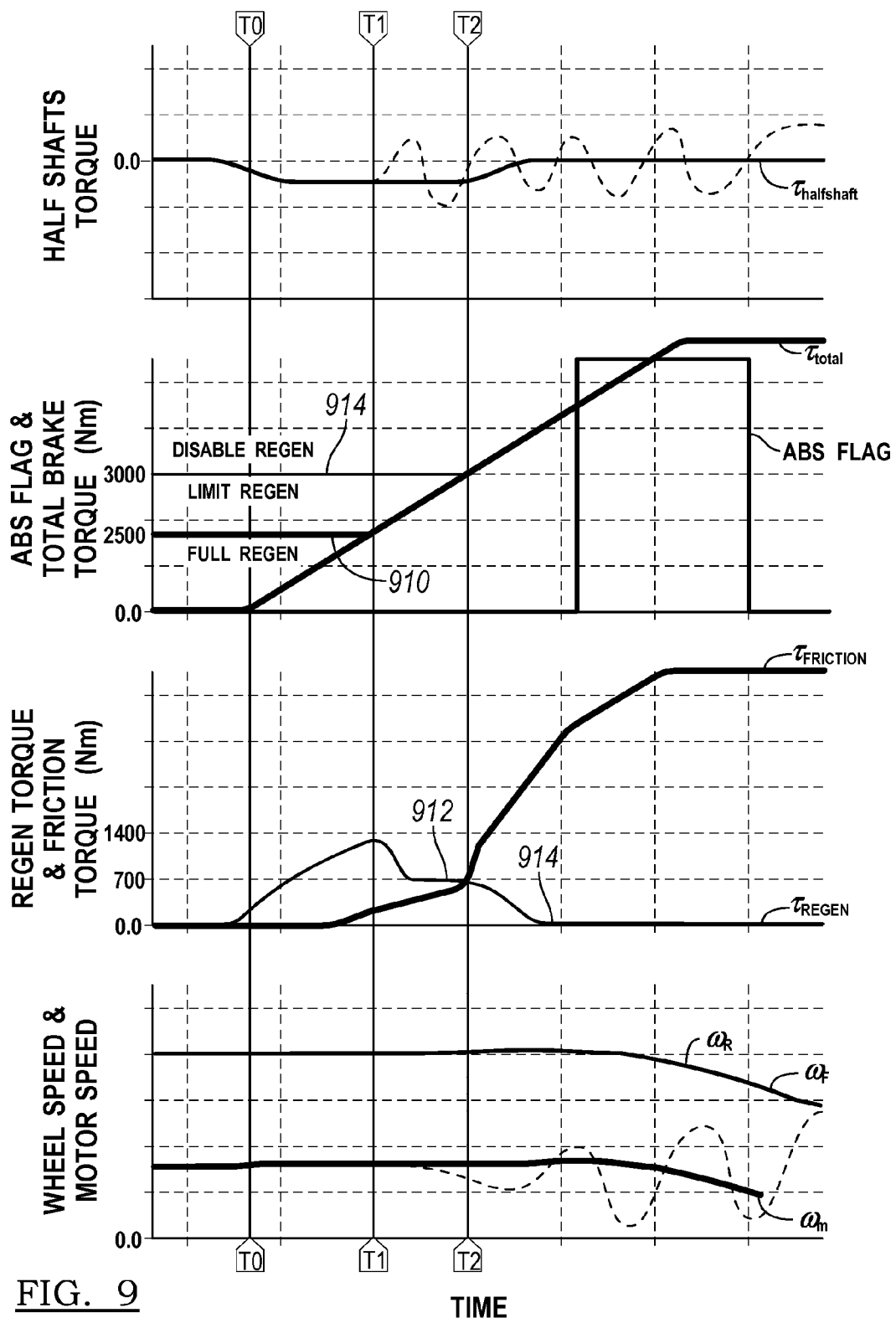
FIG. 9 is a graph illustrating how various parameters of the vehicle system of FIG. 1 change over time due to the method of FIG. 8.

FIG. 9 illustrates an example of the impact of the method 810 for mitigating powertrain oscillations during a high total braking event. FIG. 9 includes four graphs of data taken over a common period of time. At time ($t_0$) a driver begins applying the brake pedal. At time ($t_1$) the vehicle system 10 begins limiting regenerative braking. At time ($t_2$) the vehicle system 10 begins disabling regenerative braking. Waveforms shown in solid line illustrate the impact on the vehicle system 10 when the method 810 is active during a high total braking event. The waveforms shown in dashed line are for illustrative purposes and illustrate the powertrain oscillation when the method 810 is not active. The waveforms are based on both measured and calculated data. The graphs are arranged like those illustrated in FIGS. 3, 5 and 7 with a first graph illustrating $T_{halfshafts}$, a second graph illustrating $T_{total}$ and an ABS Flag signal, a third graph illustrating $T_{regen}$ and $T_{friction}$, and a fourth graph illustrating $\omega_F$, $\omega_R$ and $\omega_m$.

In one or more embodiments the vehicle system 10 limits regenerative brake torque to seven-hundred Nm when the total braking torque is above a threshold value of 2,500 Nm and disables regenerative braking when the total brake torque value is above a predetermined torque value of 3,500 Nm. At time ($t_0$) the total brake torque begins increasing, and the $T_{total}$ waveform rises. The threshold value for limiting regenerative braking corresponds to a total brake torque value of 2,500 Nm according to one embodiment, and illustrated by line 910. Full regenerative braking is restored when the total brake torque is less than 2,500 Nm. Once $T_{total}$ exceeds 2,500 Nm, regenerative braking is limited to a regenerative brake torque value of 700 Nm as indicated by point 912. The maximum value for regenerative braking corresponds to a total brake torque value of 3,000 Nm according to one embodiment, and illustrated by line 914. Once $T_{total}$ exceeds 3,000 Nm, regenerative braking is disabled, or reduced to zero, as indicated by line 914.

Some vehicles may not include sensors for measuring torque values such as half-shaft torque, regenerative torque and friction torque; or may not include sensors for measuring powertrain oscillation. However, motor current correlates to regenerative torque, and powertrain oscillation may be detected on a motor speed signal. Therefore implementation of the above vehicle system and method(s) may be detected by monitoring the motor speed signal for the presence of a sinusoidal component that is indicative of powertrain oscillation, and by monitoring the motor current which is indicative of the regenerative brake torque.

While disabling regenerative braking is considered to be synonymous with reducing regenerative brake torque to approximately zero, it may be advantageous to minimize regenerative braking to a non-zero value under certain conditions.

As such the vehicle system 10 provides advantages by predicting future powertrain oscillation based on input signals such as wheel speed and the total brake torque, and reducing regenerative braking prior to the onset of the powertrain oscillation.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   at least one wheel;
   a motor coupled to the wheel and configured to provide regenerative brake torque; and
   at least one controller configured to predict future powertrain oscillation based on input indicative of a wheel speed and to control the motor to reduce the regenerative brake torque prior to the powertrain oscillation.

2. The vehicle of claim 1 wherein the at least one wheel further comprises at least one front wheel and at least one rear wheel, and wherein the wheel speed further comprises a front wheel speed and a rear wheel speed, and wherein the at least one controller is further configured to control the motor to reduce the regenerative brake torque when a difference between the front wheel speed and the rear wheel speed is greater than a predetermined threshold speed.

3. The vehicle of claim 2 wherein the predetermined threshold speed is between eight and twenty rad/s.

4. The vehicle of claim 2 wherein the at least one controller is further configured to receive input indicative of a total brake torque that is based on at least one of a brake pedal position, an accelerator pedal position, a master cylinder pressure and a brake caliper pressure.

5. The vehicle of claim 4 wherein the at least one controller is further configured to minimize regenerative braking by controlling the motor to reduce the regenerative brake torque to approximately zero Nm, when the difference between the front wheel speed and the rear wheel speed is greater than the predetermined threshold speed and the total brake torque is greater than a predetermined brake torque value.

6. The vehicle of claim 4 wherein the at least one controller is further configured to:
   restore regenerative braking when the total brake torque is less than a predetermined brake torque value for longer than a predetermined time.

7. The vehicle of claim 1 wherein the at least one controller is further configured to:
   control the motor to reduce the regenerative brake torque in response to the presence of at least one of a high frequency component and a high amplitude component on the wheel speed input.

8. The vehicle of claim 7 wherein the high frequency component is between five and twenty Hertz.

9. A vehicle system comprising:
   a motor configured to provide regenerative brake torque to at least one wheel; and
   at least one controller configured to:
      predict future powertrain oscillation based on input indicative of a total brake torque, and
      control the motor to reduce the regenerative brake torque prior to the powertrain oscillation.

10. The vehicle system of claim 9 wherein the at least one controller is further configured to:
    receive input indicative of a brake apply rate; and
    control the motor to reduce the regenerative brake torque when the brake apply rate is greater than a predetermined threshold rate.

11. The vehicle system of claim 10 wherein the predetermined threshold rate is greater than 10,000 Nm/s.

12. The vehicle system of claim 9 wherein the at least one controller is further configured to:
    receive input indicative of a wheel speed and a brake apply rate;
    calculate a vehicle speed based on the wheel speed; and
    control the motor to minimize regenerative braking by reducing the regenerative brake torque, when the vehicle speed is greater than a predetermined speed and the brake apply rate is greater than a predetermined threshold rate.

13. The vehicle system of claim 12 wherein the at least one controller is further configured to:
    restore regenerative braking when at least one of a) the vehicle speed less than the predetermined speed for longer than a predetermined time, and b) the total brake torque is less than a predetermined total brake torque value for greater than the predetermined time.

14. The vehicle system of claim 9 wherein the at least one controller is further configured to:
    minimize regenerative braking by controlling the motor to reduce the regenerative brake torque to approximately zero Nm, when the total brake torque is greater than a predetermined maximum torque value; and
    limit regenerative braking by controlling the motor to reduce the regenerative brake torque to an intermediate torque value when the total brake torque is less than the predetermined maximum torque value and greater than a predetermined threshold torque value.

15. The vehicle system of claim 14 wherein the predetermined maximum torque value is greater than 3,000 Nm and the predetermined threshold torque value is between 2,000 and 3,000 Nm.

16. The vehicle system of claim 14 wherein the predetermined maximum torque value corresponds to a deceleration rate of approximately $-4.9$ m/s$^2$.

17. A method for controlling regenerative braking comprising:
    receiving input indicative of at least one wheel speed and a total brake torque;
    predicting an event associated with powertrain oscillation based on at least one of the wheel speed and the total brake torque; and
    controlling a motor to reduce a regenerative brake torque prior to the event for reducing powertrain oscillation.

18. The method of claim 17 wherein the at least one wheel speed input further comprises a front wheel speed and a rear wheel speed, and wherein the method further comprises:
   evaluating the event based on a difference between the front wheel speed and the rear wheel speed; and
   controlling the motor to reduce the regenerative brake torque when the difference is greater than a predetermined speed value.

19. The method of claim 17 further comprising:
   calculating a brake apply rate based on the total brake torque; and
   controlling the motor to reduce regenerative braking when the brake apply rate is greater than a predetermined rate.

20. The method of claim 17 further comprising:
   minimizing regenerative braking by controlling the motor to reduce the regenerative brake torque to approximately zero Nm, when the total brake torque is greater than a predetermined maximum torque value; and
   limiting regenerative braking by controlling the motor to reduce the regenerative brake torque to an intermediate torque value when the total brake torque is less than the predetermined maximum torque value and greater than a predetermined threshold torque value.

* * * * *